United States Patent [19]
Miller et al.

[11] 3,979,089
[45] Sept. 7, 1976

[54] VERTICAL SENSING AND CONTROL SYSTEM

[75] Inventors: Ray A. Miller; Robert B. Dillinger, both of Ridgecrest; W. James Stone, China Lake; Vernon D. Burklund, Ridgecrest, all of Calif.

[73] Assignee: The United States of America as represented by the Secretary of the Navy, Washington, D.C.

[22] Filed: Sept. 22, 1975

[21] Appl. No.: 615,867

[52] U.S. Cl. .................... 244/122 AD; 244/3.21; 244/177
[51] Int. Cl.² ........................................ B64D 25/10
[58] Field of Search ............ 244/140, 141, 122 AD, 244/122 AB, 122 AE, 122 A, 122 R, 176, 177, 3.21

[56] References Cited
UNITED STATES PATENTS

| | | |
|---|---|---|
| 3,421,720 | 1/1969 | MacDonald .................. 244/122 R |
| 3,487,445 | 12/1969 | Gluhareff .................. 244/122 AD |
| 3,868,074 | 2/1975 | Hill .................................. 244/177 |
| 3,873,050 | 3/1975 | Hill .................................. 244/177 |

*Primary Examiner*—George E. A. Halvosa
*Assistant Examiner*—Reinhard J. Eisenzopf
*Attorney, Agent, or Firm*—R. S. Sciascia; Roy Miller; Thomas W. Hennen

[57] ABSTRACT

A rocket powered escape vehicle is equipped with an electrostatic attitude sensing system which commands a rocket motor mounted in gimbals on the bottom of the vehicle to provide a vertically upward seeking escape from an aircraft independent of aircraft attitude.

11 Claims, 2 Drawing Figures

VERTICAL SENSING AND CONTROL SYSTEM

BACKGROUND OF THE INVENTION

This invention relates to attitude seeking escape vehicles and more particularly to those vehicles which utilize atmospheric electrostatic potential to sense the vertical direction.

Escape vehicles commonly used in aircraft for effecting pilot rescue during emergency situations commonly have been catapult/rocket powered ejection seats. Ejection seats of this type usually leave the striken aircraft in a straight line trajectory relative to the aircraft and angled slightly to the rear from vertical when the aircraft is upright and level. They follow a generally upward slightly curved path relative to the aircraft to enable clearance of the vertical stabilizer by the pilot and ejection seat. No means are provided for altering the trajectory relative to the earth of the seat and pilot after the seat leaves the aircraft. A disproportionately high number of fatalities occur when pilots attempt to eject while the aircraft is in an inverted or unusual attitude at low altitudes. A military specification, MIL-S-18471D(AS) which is unclassified and available to the public, defines the military requirements of minimum altitude for safe ejection in various aircraft attitudes.

A pilot ejecting from an inverted aircraft below 190 feet above ground level, using an ejection seat having an initial straight line trajectory, is in serious danger of striking the ground before his parachute has time to open. Similarly, pilots ejecting at various roll or pitch attitudes other than inverted need proportionately less altitude to eject safely but in all cases, the greater the roll or pitch attitude of the aircraft relative to a horizontal plane, the greater will be the minimum altitude required for a safe ejection.

SUMMARY OF THE INVENTION

An aircraft ejection seat is equipped with a plurality of low energy radioactive sources. Three of such sources are placed near the base of the seat in a triangular pattern and mutually within a horizontal plane defined when the seat is in its normal attitude. A fourth low energy radioactive source is attached to the ejection seat near the top of the back for use in indicating inverted or non-inverted attitudes of the ejection seat. Each radioactive source is coupled to the electrostatic potential of the earth's atmosphere in a well known manner. U.S. Pat. No. 3,873,050 to Maynard L. Hill describes an attitude sensing method and apparatus which utilizes radioactive elements to achieve inflight stabilization of an aircraft. All radioactive sources are isolated electrically from the ejection seat and are connected electrically to an electronic circuit. This electronic circuit compares the relative magnitudes of atmospheric electrostatic potential sensed by each of the three radioactive sources on the base of the seat and generates guidance commands for controlling a pivotable rocket motor mounted underneath the seat. This rocket motor maneuvers the seat to maintain all three radioactive sources at the same electrostatic potential.

When all three sources are sensing the same electrostatic potential the seat is automatically aligned in a predefined attitude which corresponds to the plane defined by the three radioactive sources being coincident with an equipotential plane in the Earth's electric field. The fourth radioactive source senses electrostatic potential at a distance from the three sources mounted on the base of the ejection seat and will be more or less positive than the three sources depending upon whether or not the ejection seat is inverted.

The electronic circuitry receives an input potential from this fourth radioactive source and if an inverted attitude is indicated, steering commands of pitch or roll are reversed to drive the seat away from inverted vertical until it begins to assume a righted attitude. At this point, steering commands once again seek the nearest vertical which rights and aligns the seat.

An ejection seat which will always seek the vertically upward direction will enable pilots to safely eject at lower altitudes than is possible with present systems while in inverted flight attitudes. Initially the pilot will be propelled clear of the aircraft and then will rotate to ascend in a vertical direction to gain maximum altitude for parachute deployment. It should be recognized that a vertical reference for a steerable aircraft escape system need not be precise and is required for only a very short duration, probably less than two seconds.

DETAILED DESCRIPTION OF AN EMBODIMENT

Figure 1:
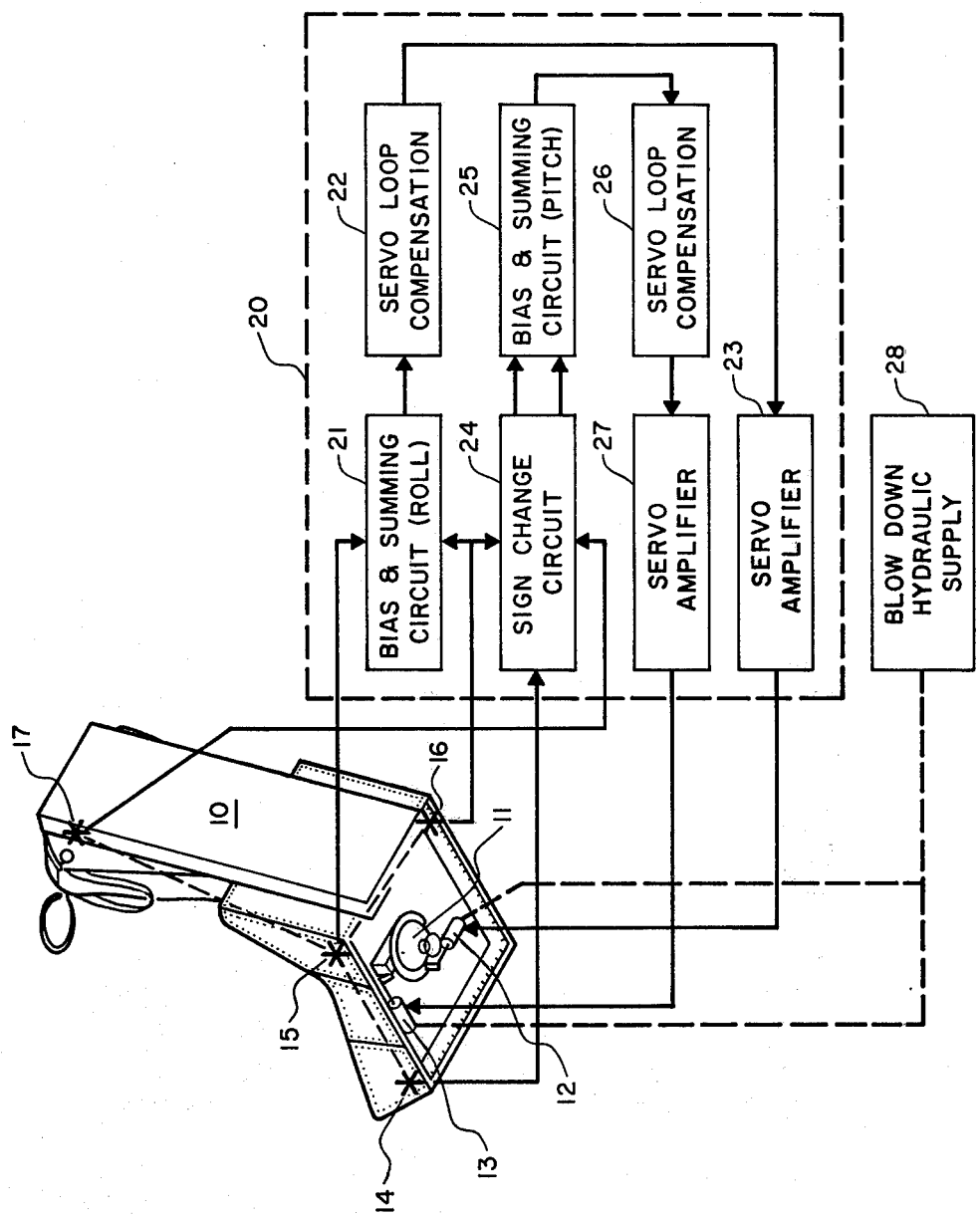
FIG. 1 is a schematic view of an electronic block diagram connected to radioactive sources mounted on an ejection seat.

Referring now to the drawings wherein like parts and elements have like reference numerals throughout the several views there is shown in FIG. 1 ejection seat 10 having low energy radioactive sources 14, 15, 16, and 17 mounted thereon. Rocket motor 11 is mounted in two axis gimbals under ejection seat 10 for providing vectored thrust, and is positioned to thrust nominally through the center of mass of the pilot and ejection seat 10 combination. Electro-hydraulic roll actuator 12 and electro-hydraulic pitch actuator 13 are both mounted on ejection seat 10 and control relative rotation of rocket motor 11 about the roll and pitch axes to create unbalanced torques for rotating seat 10 in space. Actuators 12 and 13 are powered by hydraulic fluid in reservoir 28 which is pressurized by a self contained supply of compressed gas, and are controlled by electrically operated valves which receive commands from servo amplifiers 23 and 27.

Radioactive sources 14, 15, 16 and 17 are electrically isolated from the metal frame or from any electrically conductive material of ejection seat 10 and they are electrically connected to an electronic circuit containing many elements and collectively designated by reference numeral 20. Care must be taken to locate the radioactive sources where they will sense atmospheric electrostatic potential and not any surface charge which may build up on the ejection seat, or which may be produced by the rocket motor. Such surface charges could cause the seat to stabilize in an unusual attitude or to not stabilize at all. In any event, these charges must be compensated for by appropriate means.

Electronic circuits 20 include a roll bias and summing circuit 21, a roll servo loop compensation circuit 22, a roll servo amplifier circuit 23, a pitch sign change circuit 24, a pitch bias and summing circuit 25, a pitch servo loop compensation circuit 26, and a pitch servo amplifier circuit 27. Circuits 21, 22 and 23 control roll actuator 12 and circuits 25, 26 and 27 control pitch actuator 13. Servo loop compensation circuits 22 and 26 are used to correct for any time lags within bias and summing circuits 21 and 25 so that actuators 12 and 13 will receive their guidance commands at the proper time. Sign change circuit 24 inverts the command otherwise issued to pitch actuator 13 when ejection seat 10 is inverted. This prevents ejection seat 10 from stabilizing while descending in a vertically downward direction, and causes rocket motor 11 to pitch until ejection seat 10 is once again right side up, and ascending.

Bias and summing circuit 21 receives electrostatic potential inputs from sources 15 and 16. If one source is at a different potential than the other, the seat is in a roll attitude. Roll bias and summing circuit 21 then produces a correcting signal which is further processed by servo loop compensation circuit 22 and fed to servo amplifier circuit 23 which issues a command to roll actuator 12 to pivot rocket motor 11 in order to correct the roll attitude. Similarly, sources 14 and 16 supply electrostatic potential information to pitch sign change circuit 24 which also receives electrostatic voltage potential input from source 17. Sign change circuit 24 senses the relative polarity between source 17 and source 16 and from this information determines whether source 17 is higher than source 16 thereby indicating a right side up attitude, or if the polarity of source 17 is more negative than the potential sensed by source 16 thereby indicating that ejection seat 10 is inverted. Depending upon the relative polarities of these two sources either a normal or inverted signal is sent to bias and summing circuit 25 which generates a pitch correction signal. If ejection seat 10 is inverted, the pitch correction signal which is processed by servo loop compensation circuit 27 will cause pitch actuator 13 to thrust rocket motor 11 in a direction to rotate seat 10 away from vertical so that the seat will right itself. If ejection seat 10 is right side up, then bias and summing circuit 25 will produce a signal causing pitch actuator 13 to thrust rocket motor 11 in a direction causing ejection seat 10 to seek the nearest vertical. If the seat is precisely inverted the signal from source 17 overrides stabilization information from sources 14, 15 and 16, and causes rocket motor 11 to apply full roll or pitch until the seat is righted. The seat electronics are preprogrammed not to stabilize in the vertically downward direction.

Figure 2:
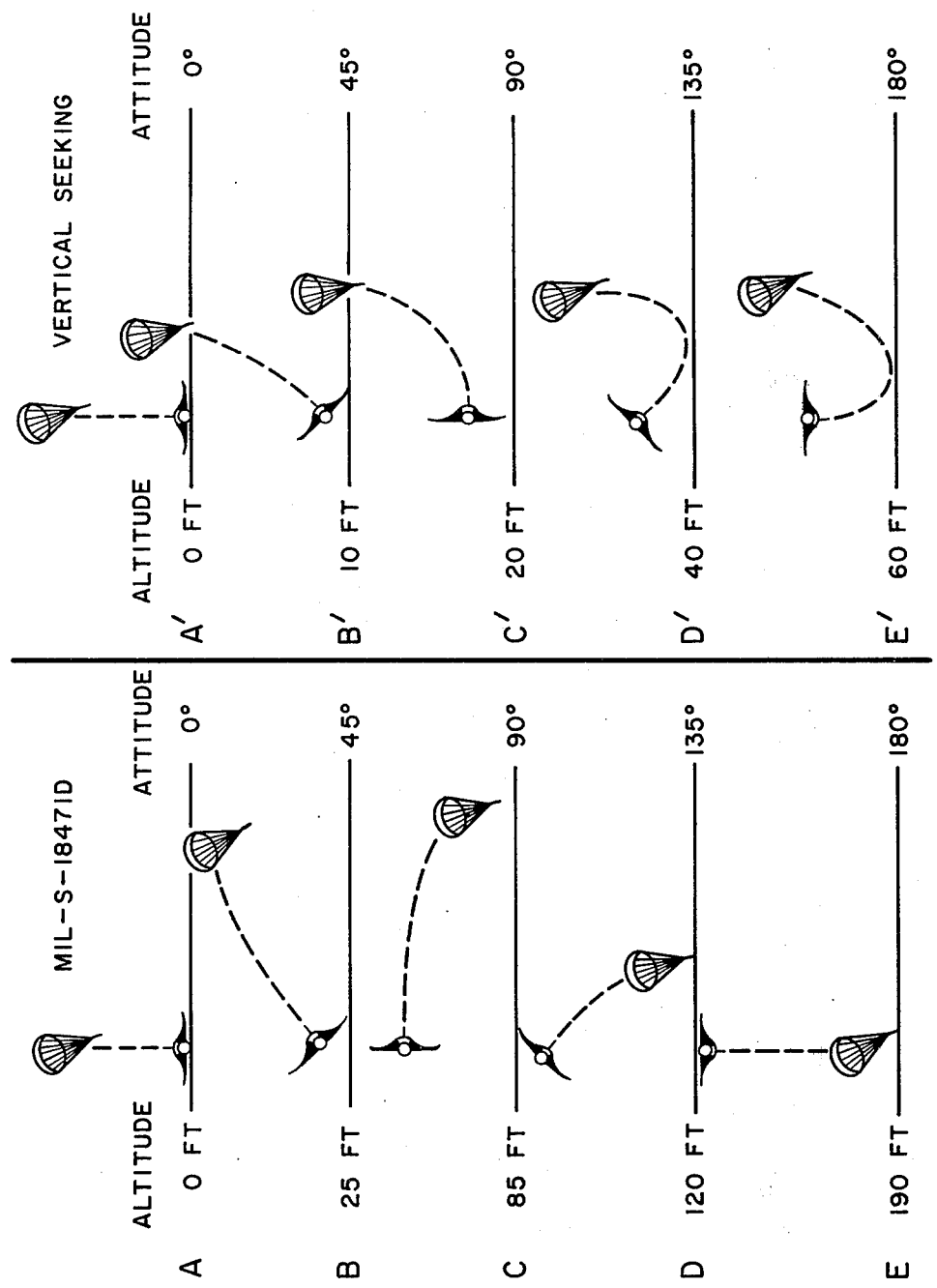
FIG. 2 is a comparison of ejection seat trajectories between a conventional ejection seat and a vertical seeking ejection seat.

The advantage of a vertically upward seeking ejection seat is made readily apparent by FIG. 2 which compares trajectories of two types of ejection seats at various roll attitudes. According to military specification MIL-S-18471D an aircraft must attain a minimum altitude depending upon its roll or pitch attitude before safe pilot ejection from the aircraft can be achieved. A, B, C, D and E in FIG. 2 show minimum altitudes considered safe for selected roll attitudes and pictorially represented are the approximate trajectories of pilot and ejection seat combinations when ejection is performed in these attitudes. By comparison, A', B', C', D', and E' in FIG. 2 show corresponding minimum altitudes required for the same roll attitudes for a safe ejection when the ejection seat is the vertically upward seeking type. As may be seen, for given roll attitudes, significantly less minimum altitude is required for a safe ejection using a vertically upward seeking seat.

In an actual ejection while the aircraft is in an inverted or semiinverted position it is contemplated that the pilot and ejection seat will be propelled out of the aircraft in a conventional manner and when ejection seat 10 has achieved a certain predefined minimum separation from the aircraft, it will immediately rotate to assume a vertical seeking attitude. Its trajectory will continue downward against the rocket thrust until the rocket thrust overcomes the downward momentum and begins moving the seat in the vertical direction. Near the end of the trajectory, the pilot separates from seat 10 and the pilot's parachute opens.

Radioactive sources 14, 15, 16 and 17 may be alpha particle emitters such as polonium 210 which has a half life of 138 days. Other radioactive materials having a longer half life such as americium will work equally well. These radioactive materials have low energies and present no danger to the pilot or crew unless ingested. A radioactive source ionizes the air immediately adjacent to the source and thereby forms a voltage probe coupled to the electrostatic potential in the Earth's atmosphere. This is a much more efficient probe than would be formed by a non-radioactive electrode. Other materials, such as steel wool, may be used for the voltage probe electrodes, but they are generally inferior because they saturate and therefore have longer response times. The response time of the voltage probes in this invention should be very fast since the rocket burn time is only about two seconds and attitude corrections must be made quickly enough to utilize the rocket thrust. The electronic systems of this invention are powered by a thermal battery which is carried by the ejection seat in a well known manner.

Of course it is recognized that from certain aircraft attitudes an ejection trajectory utilizing roll rather than pitch may be more advantageous, or a combination of rolling and pitching may be the desired maneuver. For example, an ejection utilizing pitch to right the ejection seat is less satisfactory if the aircraft is in an inverted pitched down attitude. The ejection seat seeking to rise may carry the pilot into the vertical stabilizer of the aircraft, or in an inverted pitched upward attitude the seat may carry the pilot back into the path of the striken aircraft. In these situations, roll, carrying the pilot to one side of the aircraft may be a safer maneuver. In other situations, such as semi-inverted level flight at severe roll attitudes, a combination of rolling and pitching will insure that the pilot clears the aircraft and reaches a vertical seeking attitude in a minimum of time. For maximum altitude at the time of parachute deployment, it is essential that the seat establish vertical thrust in a minimum length of time because rocket motor 11 has a total burn time of typically less than 2 seconds.

It is seen that a sign change circuit similar to circuit 24 may be used in the roll controls as well as the pitch controls. By supplying other sensors and electronic logic circuits in a well known manner as needed for sensing velocity and acceleration as well as attitude of the aircraft and ejection seat, an ejection seat which efficiently leaves an aircraft in any attitude and safely clears the aircraft while reaching a maximum altitude before rocket motor burnout occurs, is easily achieved.

While several embodiments of the invention have been described various changes in the form and relative arrangement of the parts, which will now appear to those skilled in the art may be made without departing from the scope of the invention.

What is claimed is:

1. An attitude seeking emergency escape vehicle, comprising:
   a cradling member havng means for attachment to the body of a user;
   propulsion means pivotally attached to said cradling member;
   positioning means connected to said cradling member and to said propulsion means, said positioning means being responsive to guidance commands;
   first attitude sensing means for detecting when said vehicle is inverted;
   second attitude sensing means for detecting vehicle attitudes of pitch and roll relative to a predefined plane;
   guidance command generating means communicating with said first and second attitude sensing means, and communicating with said positioning means,
   for establishing and maintaining said vehicle in a predefined attitude during an escape maneuver.

2. The escape vehicle of claim 1 wherein said cradling member is an aircraft ejection seat.

3. The escape vehicle of claim 1 wherein:
   said propulsion means is a rocket motor mounted in gimbals, pivotable about two mutually perpendicular axes for providing thrust vectoring;
   and said positioning means are electro-hydraulic servomechanisms.

4. The escape vehicle of claim 1 wherein said first attitude sensing means comprises a radioactive source electrically isolated from and fixedly secured to said cradling member, and coupled to atmospheric electrostatic potential for detecting the relative polarity of electrostatic potential existing between said source and said second sensing means to indicate to said guidance command generating means when said escape vehicle is inverted.

5. The escape vehicle of claim 1 wherein:
   said second attitude sensing means comprises a plurality of radioactive sources arranged upon said cradling member to define a plane;
   said sources being electrically isolated from and fixedly secured to said cradling member and coupled to atmospheric electrostatic potential for detecting the magnitude of atmospheric electrostatic potential at a plurality of coplanar locations on said cradling member.

6. The escape vehicle of claim 1 wherein said first attitude sensing means comprises a single radioactive source securely mounted on said cradling member at a location vertically remote from said second attitude sensing means when said cradling member is in said predefined attitude;
   and wherein said second attitude sensing means comprises three radioactive sources arranged in a triangular pattern defining a plane,
   said sources of said first and second attitude sensing means being electrically isolated from and fixedly secured to said cradling member, coupled to atmospheric electrostatic potential, and communicating electrically with said guidance command generating means.

7. The escape vehicle of claim 6 wherein said guidance command generating means comprises an electric circuit having:
   means for comparing the relative magnitudes of electrostatic potential existing at each radioactive source of said second attitude sensing means;
   means for determining the relative electrostatic polarity between the radioactive source of said first attitude sensing means and at least one of the radioactive sources of said second attitude sensing means;
   means for controlling said positioning means responsive to signals from said magnitude comparing means and said polarity determining means;
   for causing said propulsion means to pivot and create an unbalanced torque on said cradling member to align said escape vehicle relative to said predefined plane.

8. The escape vehicle of claim 7 wherein said radioactive sources are polonium 210.

9. The escape vehicle of claim 7 wherein said radioactive sources are americium.

10. The escape vehicle of claim 7 wherein said vehicle is capable of coordinated pitch and roll maneuvers.

11. A vertical sensing control system for controlling the attitude of a body relative to a predefined plane near the surface of the earth, said control system having capability to distinguish between inverted and non-inverted alignment with said plane, said control system comprising:
    means for sensing the relative magnitude of atmospheric electrostatic potential at at least three locations on said body;
    means for causing said body to rotate about two mutually perpendicular axes which lie in said predefined plane, in response to guidance commands;
    means for sensing relative electrostatic polarity between a location spaced from said electrostatic potential magnitude sensing means which is vertically remote when said body is aligned with said predefined plane, and at least one of said electrostatic potential magnitude sensing means; and
    guidance command generating means communicating electrically with said relative polarity sensing means and said relative magnitude sensing means and communicating with said body rotation causing means;
    for causing said body to rotate until said voltage potential relative magnitude sensing means indicate equal magnitude electrostatic potential at at least three locations on said body, and said relative polarity sensing means indicates a predefined polarity relative to said electrostatic potential sensing means, thereby indicating coplanar alignment of said magnitude sensing means with an equipotential plane in the earth's electrostatic field, and a non-inverted attitude with respect to said equipotential plane.

* * * * *